United States Patent [19]
Kahn et al.

[11] 4,028,591
[45] June 7, 1977

[54] RELAY CONTACT PROTECTOR

[75] Inventors: David Kahn, Harrisburg; Howard Richard Peiffer, New Cumberland, both of Pa.

[73] Assignee: AMP Incorporated, Harrisburg, Pa.

[22] Filed: Oct. 22, 1975

[21] Appl. No.: 624,810

Related U.S. Application Data

[63] Continuation-in-part of Ser. No. 399,643, Sept. 21, 1973, abandoned, which is a continuation-in-part of Ser. No. 351,716, April 16, 1973, abandoned.

[52] U.S. Cl. .............................. 361/11; 338/22 R; 338/224
[51] Int. Cl.² ......................................... H02H 3/00
[58] Field of Search .............................. 338/20–22, 338/25, 13, 224, 332; 317/9 C, 11 C, 11 R, 11 A; 252/518; 423/592

[56] References Cited

UNITED STATES PATENTS

| | | | |
|---|---|---|---|
| 493,314 | 3/1893 | Thomson | 338/224 X |
| 3,435,398 | 3/1969 | Gielisse et al. | 338/22 |
| 3,650,680 | 3/1972 | Teow et al. | 423/592 |

OTHER PUBLICATIONS

Jacques C. Duchene et al., *Initiation of Switching in VO₂ Coplaner Devices*, "IEEE Transactions on Electron Devices," vol. ED–18, No. 12, pp. 1151–1155, Dec. 1971.

*Primary Examiner*—C. L. Albritton
*Attorney, Agent, or Firm*—Russell J. Egan

[57] ABSTRACT

A polyconductor device is connected in series with a pair of current carrying contacts of a relay switch to delay the current surge through the contacts during the closure thereof. The polyconductor device has a negative temperature-resistance characteristic such that its electrical resistance value at temperatures below a predetermined transition temperature is at least several orders of magnitude larger than its resistance value at temperatures above the transition temperature. When the contacts are initially closed, only a small electric current passes through the polyconductor device which is in its high resistance state. After a predetermined time, the current heats the device to a critical temperature at which time polyconductor device switches to its low resistance state and the current flows essentially unimpeded thereby. During the heat-up time the contacts of the relay switch have completed bouncing and are in a stable, closed condition.

21 Claims, 7 Drawing Figures

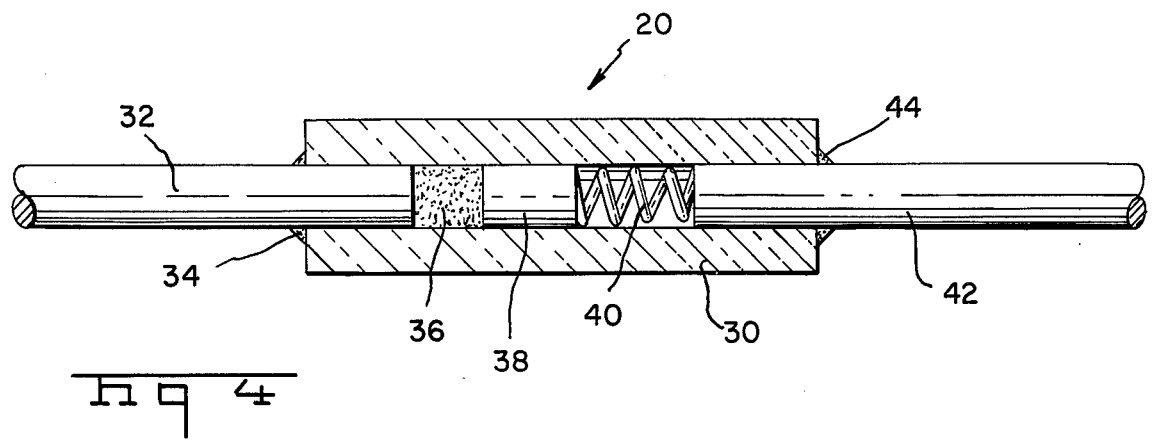
_Fig 4_
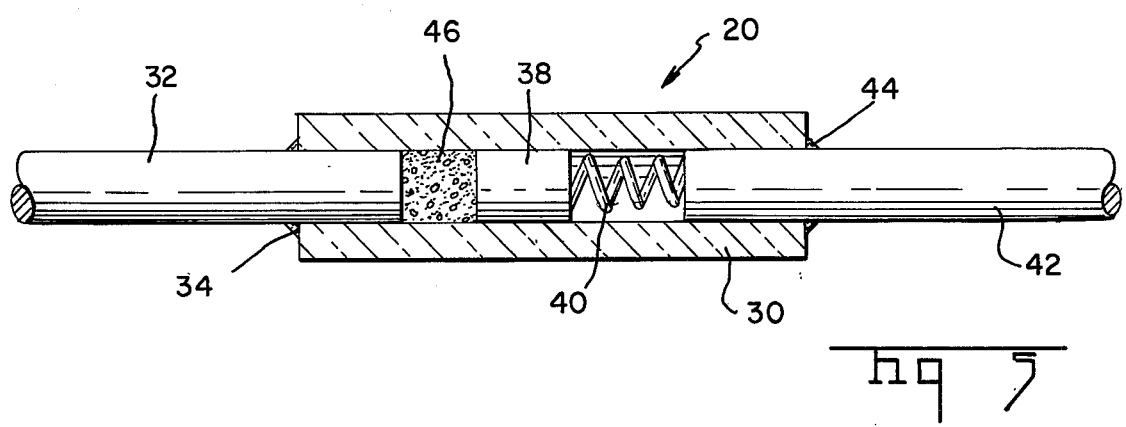
_Fig 5_

RELAY CONTACT PROTECTOR

CROSS REFERENCE TO RELATED APPLICATION

The present application is a continuation-in-part of our application Ser. No. 399,643 filed Sept. 21, 1973, now abandoned, and which is in turn a continuation-in-part of our application Ser. No. 351,716, filed Apr. 16, 1973, and now abandoned.

BACKGROUND OF THE INVENTION

The present invention relates to a device for eliminating current surge through switch contacts and the like when the contacts are initially closed. More particularly, the invention relates to a negative temperature-resistance characteristic device with a first order resistivity transformation for use in delaying current flow through current carrying switch contacts when they are initially closed.

A common problem in switch contacts, particularly leaf-spring mounted contacts such as relay switch contacts, is that they deteriorate over a period of time due to arcing. This arcing is due to a number of causes such as bouncing of the contacts when they first close. In the case of bouncing, the switch contacts usually do not completely mate at the first touch, but instead the movable contact tends to bounce several times before it reaches a permanent, stable state with respect to the fixed contact. Such bouncing increases the transfer of conductive material between the switch contacts and the formation of a series of electric arcs. This is especially true when the contacts are in series with an incandescent lamp load, since the initial current flow can be up to ten times larger than the steady state flow.

In some prior art devices the arcing effects of bouncing are eliminated by elaborate and expensive designing of the relay contacts and their supporting frames. In still other prior art devices the arcing effects of bouncing are eliminated by connecting a relatively high resistance in series with the switch contacts. The high resistance prevents a significant amount of current from flowing through the relay contacts when they are first closed. After the contacts have ceased their bouncing, the resistance is shunted out of the circuit by the closing of a separate switch. This type of device has several disadvantages, such as requiring some extra means for closing the shunt switch (which may also be subject to arcing) and increasing the complexity of the relay switching circuit.

Recently a temperature-sensitive polyconductor compound has been developed which demonstrates a negative temperature-resistance characteristic. In this type of compound, a relatively high electrical resistance is presented, provided the compound has a temperature below a predetermined critical temperature which is unique for each material. When the temperature of the compound reaches this critical temperature, a first order transformation occurs with an atomic rearrangement within the unit cell which often results in an increase in crystal symmetry of the material. In a strain free homogeneous crystal this transformation can be observed to take place over a negligible temperature interval, that is in much less than a degree centigrade. As a result of this transformation the electrical resistance is sharply reduced by several orders of magnitude, for example to 1/1000 of its high resistance value, and it essentially thereafter becomes conductive. The material again resumes its high resistance state when the temperature of the compound is reduced below the critical temperature.

Polyconductive compounds of this type are described further in U.S. Pat. Nos. 3,402,131 to Futaki and 3,532,641 to Chamberland. Some prior uses of this type of polyconductor have been in temperature type alarm systems in which the compound is connected in series with an alarm so that when the ambient temperature surrounding the compound reaches the critical temperature, such as in the case of a fire, the alarm is activated.

The present invention overcomes the above and other disadvantages of prior art relay contact protector devices by a novel design utilizing a negative temperature-resistance polyconductor which additionally simplifies construction of the device.

SUMMARY OF THE INVENTION

A preferred embodiment of a time delay current limiter for protection of switch contacts and the like according to the invention comprises a polyconductor connected in series with a source of current and the device to be protected. The polyconductor is composed of a material which has a negative temperature-resistance characteristic such that the material has a relatively high resistance below a critical temperature and a resistance which is several orders of magnitude less when the material is at, or slightly above, the critical temperature. Means are provided for passing electrical current through the polyconductor material in an amount capable of raising its temperature to the critical temperature after a predetermined time delay and for maintaining it at or slightly above the critical temperature by Joule effect heating. This resistance-temperature behavior at a polyconductor is distinct from that of a thermistor. Although both have a negative temperature-resistance characteristic at low temperature, the thermistor does not experience a transition and there is no sudden change in the resistivity vs. temperature curve. A polyconductor, on the other hand undergoes a first order transition and a sudden drop in resistivity at the critical temperature. There is, of course, no such critical temperature for a thermistor. Another difference is that in a polyconductor, the transformation of the critical temperature is from a semiconductor conductivity to a metallic conductivity, so that the resistance vs. temperature curve above the critical temperature exhibits a small positive slope. A thermistor, on the other hand has a negative resistance vs. temperature slope throughout its temperature range.

The sharp and large drop in resistance exhibited by the polyconductor is essential for the operation of the device. It is necessary that the resistance of the polyconductor, in series with the load connected to the relay contacts, have a resistance at temperatures below the critical temperature much larger than the load to limit the current during contact bouncing during make. Subsequent to this it is necessary for the polyconductor resistance to quickly drop to a value much lower than the load resistance so that a minimum of the electrical energy supplied to the load is dissipated in the polyconductor.

This behavior cannot be accomplished by the use of the traditional thermistor since the thermistor would have to experience an extremely large temperature excursion to result in the large resistance drop observed in polyconductors. This would be wasteful of power and very slow.

In one embodiment the polyconductive material is connected is series with a pair of relay switch contacts and to the current source so that, when the switch contacts are first closed, a relatively low electric current is passed through the polyconductor to gradually heat it above the critical temperature in accordance with the Joule effect. When the polyconductor has reached the critical temperature, its conductivity is increased by several orders of magnitude, almost instantaneously, and the switch contacts thereafter carry their intended current load. The time delay required for the polyconductor to reach its critical temperature, due to the Joule heating, is selected by adjusting the cold resistance of the polyconductor and the heat flow to the ambient to be greater than the time required for the switch contacts to become completely and stably closed. Thus the use of the polyconductor of the invention in series with the switch contacts eliminates damage to the contacts caused by arcing due to bouncing, for example.

In one preferred embodiment the polyconductor consists essentially of crushed crystals of a polyconductor held in a glass cartridge by a spring loaded electrode mechanism. In still another embodiment the crushed crystals of the polyconductor are mixed with a material having a high resistivity and low temperature characteristic, e.g., a carbon compound. The carbon admixture serves to help heat the polyconductor portion, which, when it reaches its critical temperature, will shunt out the carbon component. The use of the carbon admixture provides a simplified way of controlling the time delay of the polyconductor device without effecting its critical temperature, and also serves to limit the increase in resistivity of the mixture when exposed to a very low ambient temperature.

It is therefore an object of the present invention to provide a switch contact protecting device which is small in size, simple in construction, has no moving parts, and substantially eliminates current surges and arcing in switch contacts upon initial closure.

It is another object of the invention to provide a switch contact protector which automatically delays the surge of current passing through the switch contacts when they first mate and then, after a predetermined time delay sufficient to allow the contacts to achieve a stable condition, allows full current to flow through the mated contacts.

It is still another object of the invention to provide a switch contact protector which contains no moving parts.

It is yet another object of the invention to provide a current surge time delay device in which the time delay for controlling current surge is easily adjustable during manufacture.

The foregoing and other objectives, features, and advantages of the invention will be more readily understood upon consideration of the following detailed description of certain preferred embodiments of the invention, taken in conjunction with the accompanying drawings.

BRIEF DESCRIPTION OF THE DRAWINGS

FIG. 4 is an enlarged side elevation, partly in section, of an embodiment of the present invention schematically depicted in FIG. 1;

FIG. 5 is an enlarged side elevation, partly in section, of a second embodiment of the invention;

DESCRIPTION OF CERTAIN PREFERRED EMBODIMENTS

Figure 1:
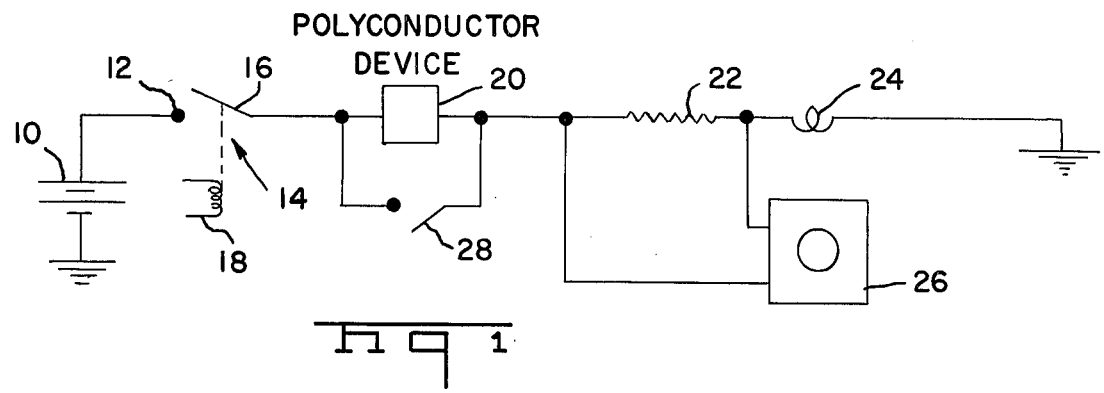
FIG. 1 is a schematic diagram of a test circuit for illustrating the current limiting properties of the present invention.

A schematic diagram for a test circuit, useful in illustrating the current limiting poroperties of the present invention, is shown in FIG. 1. A source of current 10, such as a battery, is connected between a circuit ground and a first contact 12 of a relay switch 14. The second contact 16 of the relay switch 14 is controlled by a relay coil 18 which is adapted to be energized by an external source of power (not shown). Either or both of the switch contacts 12, 16 are leaf-spring mounted. The second contact 16 of the relay switch 14 is connected in series through a polyconductor device 20 to one side of a current monitoring resistor 22, which is much smaller than the load resistance. The other side of the current monitoring resistor is connected to a lamp 24 and the other side of the lamp is connected to the circuit ground. In this embodiment the lamp is the load which is energized when the relay contacts are closed. An oscilloscope 26 is connected in parallel with the resistor 22 to monitor the current flow and a switch 28 is connected in parallel with the polyconductor device 20. By way of example only, the potential of the battery is 12.5 volts, the resistance of resistor 22 is approximately 0.05 ohms, and the cold resistance of the lamp 24 is 0.5 ohms. In this embodiment the polyconductor device is vanadium dioxide ($VO_2$).

Figure 2:
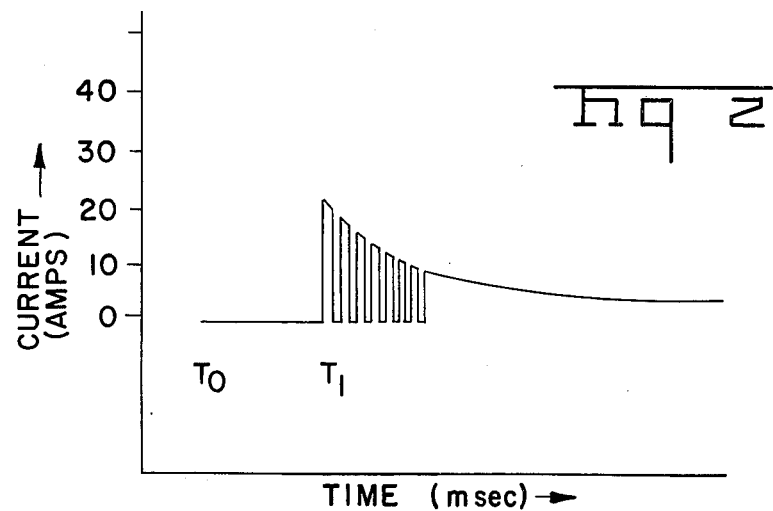
FIG. 2 is a diagram illustrating the passage of current through the relay controlled switch contacts in the circuit of FIG. 1 when they are first closed and with the present invention bypassed.

FIG. 2 illustrates the results of operating the circuit of FIG. 1 with the switch 28 closed so as to shunt the polyconductor device 20. Electric current from the external source is supplied to energize the relay coil 18 at a time $T_0$. Approximately 11 milliseconds later, at a time $T_1$, the second contact 16 of the relay switch 14 is initially closed with contact 12 to produce a spike current through the current monitoring resistor 22 and the lamp load 24 of approximately 25 amps, as depicted in FIG. 2. However, since the second contact 16 of the relay switch 14 bounces against the first contact 12, it produces a series of current spikes which do not become stabilized until approximately 9 milliseconds after time $T_1$. This bouncing of the switch contacts eventually results in severe deterioration due to the repeated arcing which takes place during each bounce, as is well known in the art.

Figure 3:
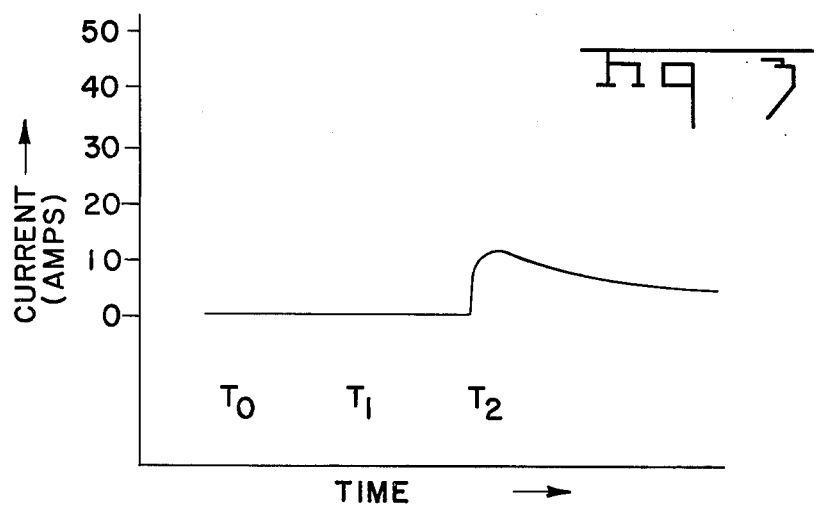
FIG. 3 is a diagram illustrating the current delaying effect of connecting the present invention in series with the relay controlled switch contacts in the circuit of FIG. 1.

FIG. 3 shows the results which are obtained from the circuit depicted in FIG. 1 when the shunt switch 28 is open. Again the relay coil 18 is energized at a time $T_0$ and the switch contacts 12, 16 initially mate at a time $T_1$ to pass current from the battery 10 through the polyconductor device 20. In this embodiment, the polyconductor used is vanadium dioxide ($VO_2$ or $V_2O_4$).

Although the critical temperature of pure vanadium dioxide is 68° C, the critical temperature can be altered by incorporating other elements into the crystal lattice, as described in U.S. Pat. Nos. 3,402,131 to Futaki; 3,532,641 to Chamberland; and 3,542,697 to Chamberland. The polyconductor device 20 is gradually Joule-effect heated by the small current that passes through it during the bouncing of the switch contacts and the temperature of the polyconductor device is eventually raised to the critical temperature (68° C, for example) at a time $T_2$. At time $T_2$ the polyconductor device 20 becomes essentially conductive to pass an initial current of 10 amps which tapers off to a current value which is slightly less than 3 amps when lamp filament 24 is hot and the circuit is stabilized. The high current through the polyconductor device 20, after it reaches its critical temperature, is sufficient to maintain it at or above the critical temperature by the Joule-effect heating.

The current passed by the polyconductor device 20 in its stabilized condition above the critical temperature is essentially the same as the current passed when the switch 28 is closed to shunt the polyconductor device. It should be noted that between the time $T_1$ when the switch contacts 12, 16 are initially closed and the time $T_2$ (approximately 13.5 milliseconds subsequent to time $T_1$) when the polyconductor device 20 becomes conductive, an almost insignificant amount of current (approximately 2ma.) flows through the resistance 22 and the switch contacts 12, 16. Thus during the period when the switch contacts 12, 16 are bouncing, a relatively small amount of current is passed through them and thus the deteriorating effects of arcing are avoided.

FIG. 4 is a detailed view, partially in section, showing the polyconductor device 20 as comprising a hollow insulating sleeve 30 which is preferably constructed of a material which is both electrically and thermally insulating such as glass. A first conductor 32 inserted in one end of sleeve 30 and sealed thereto by a hermetic seal 34. Next adjacent the end of the first conductor 32 within the sleeve 30 are crushed crystals 36 of a polyconductor material, such as vanadium dioxide. The polyconductor crystals 36 are pressed against the end of the first conductor 32 by a plunger 38 which is slidable within the bore of the insulating sleeve 30 and biased by a spring 40 which is also within the bore of sleeve 30. The spring 40 is held in place by the end of a second conductor 42 which extends out of the opposite end of the sleeve 30. The second conductor 42 is sealed to the opposite end of the tube by a hermetic seal 44.

It should be apparent that while the construction depicted in FIG. 4 is particularly advantageous, in other embodiments other types of constructions may be utilized. The selection of the critical temperature can be accomplished by doping the polyconductor crystals with other materials or in still other embodiments by choosing other types of polyconductors, as is known in the art and is described more particularly in the above-identified patents.

In a second embodiment of the present invention, as shown in FIG. 5, a mixture 46 of a carbon compound and the polyconductor crystals is substituted for the pure polyconductor crystals 36 of the embodiment of FIG. 4 in order to increase the effect of Joule heating and thereby decrease the time required to reach the critical temperature. As the temperature of the device, and more particularly of the polyconductor crystals, reaches the critical temperature, the polyconductor crystals become substantially conductive and essentially short out the carbon component. Other high resistivity, low temperature coefficient compounds may be substituted for the carbon in other embodiments. One advantage of this embodiment is that the time delay of the device may be easily and selectively controlled during manufacture without altering the critical temperature of the device. Thus the critical temperature may be selected to be well above the ambient temperature of the operating environment and yet the time delay may still be selectively controlled by the proportion of added carbon material.

The conductors 32, 42 of either of the above discussed embodiments would be used to connect the device in series with either of a pair of mating contacts of a relay switch or the like.

Figure 6:
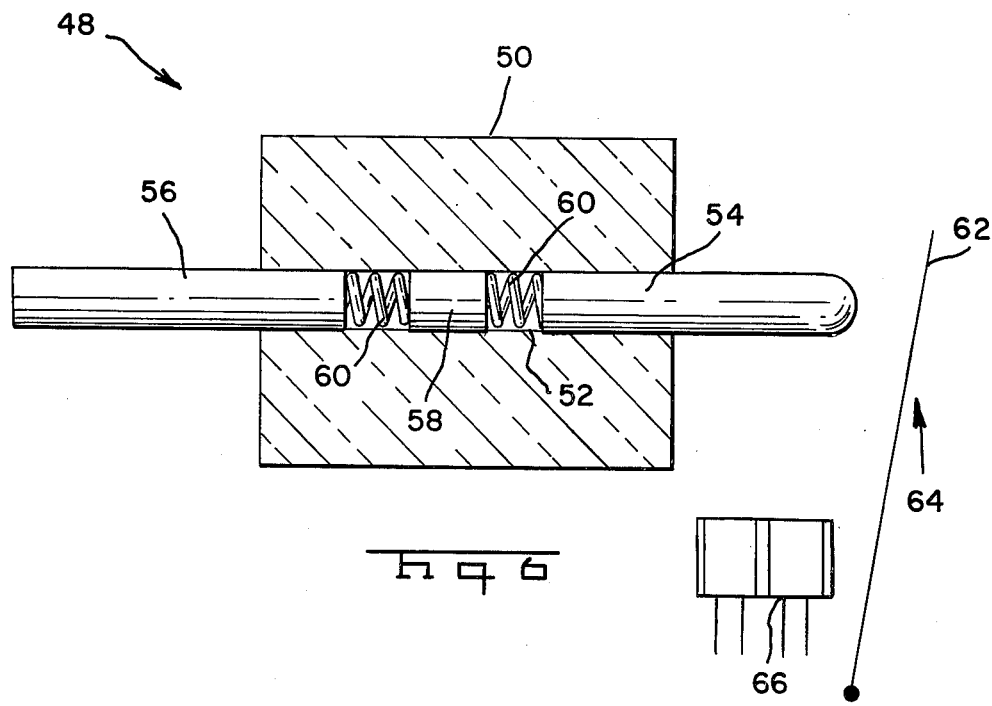
FIG. 6 is an enlarged side elevation, partly in section, of a third embodiment of the present invention.
Figure 7:
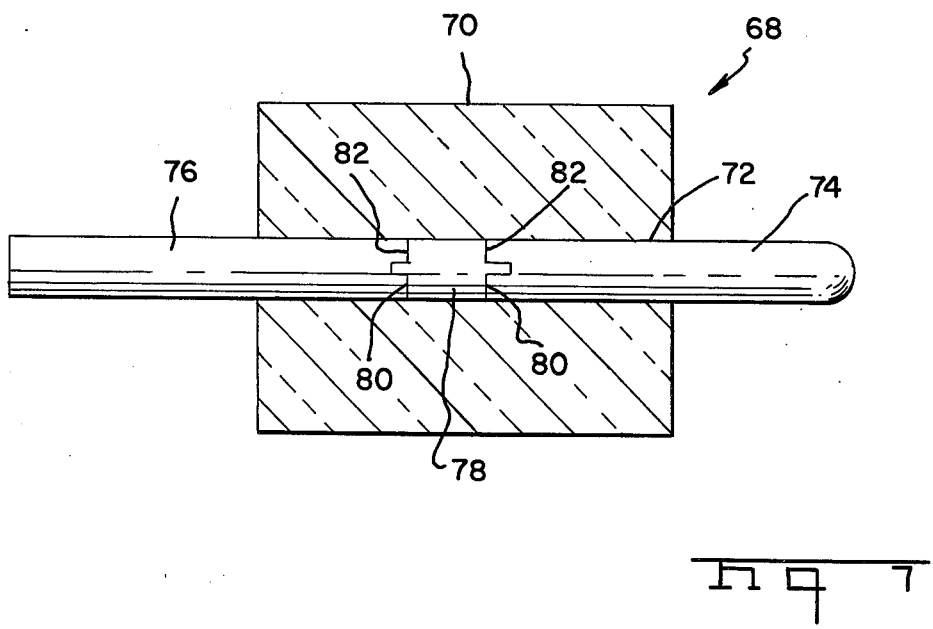
FIG. 7 is an enlarged side elevation, partly in section, of a fourth embodiment of the present invention.

As a further alternative, the subject device can be used to replace a contact in a relay or terminal block as shown in FIGS. 6 and 7. The terminal block 48 includes a housing 50 formed of an electrically insulating material. The housing has, in the illustrative embodiment, a longitudinally extending bore 52 formed therein which frictionally engages and provides mounting support for an electrically conductive contact pin 54 and an electrically conductive contact element 56. The latter may include any of the well known conductor engaging means (not shown) to provide an electrical connection between a wire lead and the terminal block. Typically, the pin 54 is formed either as a male connector, which cooperates with a female connector member, or as a fixed contact for a relay switch or the like. A polyconductor element 58 is positioned in the bore 52 of the terminal block. The polyconductor is maintained in electrical contact with the pin 54 and element 56 by a pair of spring members 60. In this embodiment of the invention the conductive elements or pins 56, 54 may be removably mounted in the housing 50, so as to permit removal of the polyconductor 58, by arranging the pins so as to be tightly, but only frictionally received within the bore 52. Spring members 60 therefore simply serve to provide electrical connection between the pins and the polyconductor 58.

Polyconductor 58, comprises a cylindrical element formed of a polyconductive material having a negative temperature-resistance characteristic such that its electrical resistance value at temperatures below a predetermined transition or critical temperature is at least several orders of magnitude larger than its resistance value at temperatures above the transition temperature, while exhibiting an abrupt transition between its high resistance value and low resistance value at the transition temperature, usually with a 1° C temperature range. The polyconductor can be formed from any of the known polyconductor materials having a transition or Curie temperature at which the material abruptly transforms from a relatively nonconductive to a conductive material.

Preferably, the material selected for use in forming the polyconductor 58 of the present invention has a transition temperature which is above the temperature to which the terminal block 50 is normally subjected, so that its temperature can vary above and below its transition temperature in order to make use of the desirable characteristics of the polyconductor material. It will be appreciated that, for example, if the terminal block is to be used in high temperature applications, i.e. where the ambient temperature is above 65° C, then a material having a transition temperature higher than 65° would have to be used in lieu of vanadium dioxide. In that case a different material, for example $Ti_3O_5$, having a transition temperature of 167° C would be selected.

With the proper polyconductive material selected to form the polyconductor cylinder 58 inserted in terminal block 50, as illustrated in FIG. 6, it will be seen that when a movable contact 62 of a relay 64 is closed against pin 54 by energization of relay coil 66 (for example to energize the circuit to which the terminal block is connected), the polyconductor 58, whose initial temperature is below its transition temperature, will have a relatively high resistance value and will permit only a relatively low current to pass therethrough. As the contact 62 of the relay 64 bounces on the pin 54 of the terminal block 50, the temperature of the polyconductor is gradually increased by Joule effect heating as a result of the current pulses which pass through it during the bouncing of the contacts so that ultimately the temperature of the polyconductor is raised to its critical transition temperature, after a time delay determined by the characteristics of the polyconductor. When the polyconductor reaches its transition temperature it abruptly switches to its relatively high conductive state, permitting the full current to flow through the terminal block and conductors or contacts. This high current flow through the polyconductor element, once it has reached its transition temperature, will be sufficient to maintain the polyconductor at or above its critical transition temperature by Joule effect heating until the switch is opened. Thus, the polyconductor is in effect self-latching in that once it reaches its conductive state, it will stay in that state until current is removed therefrom. Accordingly, it will not return to its relatively non-conductive state as long as the relay 64 is energized.

The current passing through the polyconductor in its stabilized condition, above the critical transition temperature, is essentially the same as the current that would pass through the terminal block had the poly conductor been removed and a direct electrical connection made between the pin 54 and element 56. Moreover, between the time when the contacts of the relay switch and terminal block are initially closed and the time when the polyconductor device becomes conductive (e.g. 13.5 milliseconds) almost an insignificant amount of current has passed through the switch contacts and polyconductor. Thus, during the period when the switch contacts are bouncing, a relatively small amount of current is passed through the contacts of the switch and terminal block, so that the deteriorating effects of arcing are avoided.

The time delay between the closing of the switch and the transition of the resistance state of the polyconductor can be adjusted by mixing with the polyconductive material forming cylinder 58 a material having a high resistance value and a low temperature coefficient characteristic. This will increase the effect of Joule heating and thereby decrease the time required for the polyconductor to reach its critical transition temperature. Such materials can, for example, constitute carbon compounds of various types which can be conveniently mixed with the crystals of polyconductive material used to form the disk. Such carbon compounds will cause the polyconductor to heat more rapidly under Joule effect heating so that its transition temperature is reached in a shorter period of time, but they do not effect the transition temperature of the polyconductor itself. As the temperature of the polyconductor cylinder 58, and more particularly of the polyconductor crystals, reaches the critical temperature, the polyconductor crystals become substantially conductive and essentially short out the high resistance carbon components, so that those components have substantially no effect in the device above the critical transition temperature. Of course, other high resistivity, low temperature coefficient compounds may be substituted for the carbon in other embodiments. An advantages of this form of polyconductive element is that the time delay of the device is easily and selectively controlled during manufacture without altering the critical temperature of the polyconductor. Thus, the critical transition temperature may be selected to be well above the ambient temperature of the operating environment and yet the time delay may still be selectively controlled by the proportion of added carbon material.

It is also noted that the transition temperature of the polyconductor materials themselves can be varied as desired in order to adjust the characteristics of the polyconductr cylinder or disk to meet the requirements of the operating conditions of the circuit. This is achieved by doping the polyconductive material with minor amounts of fluoride or optionally with metals, as described, for example in the above-identified patents.

Another embodiment of the invention is illustrated in FIG. 7 wherein a terminal block 68 is provided of similar construction to the terminal block 48 of FIG. 6. This terminal block includes a housing 70 formed of an insulated material, such as for example, plastic or glass, having a longitudinal bore 72 formed therein which slidably and frictionally receives and retains the contact or connector pin 74 and connector 76. In this embodiment of the invention a polyconductor element 78 may be provided which is substantially integrally formed with or monolithic in construction with the connectors 74. This can be accomplished by providing the polyconductor element 78 with preformed end portions 80 of predetermined configuration adapted to mate with complementary end portions 82 of the respective contact elements, e.g. male-female complementary ends. In this manner, the polyconductor element is operatively connected directly to the contacts of the terminal block. Moreover, as the contact elements are simply frictionally engaged within the terminal block, they can be removed from the block along with the polyconductor element.

By the construction of the present invention, a terminal block is provided which is adapted to delay current surges in the connectors of the block and in particular in a connector of the block and an associated spring contact of a relay swtich. By this arrangement it is not necessary to modify the construction of the relay switch, but rather the advantages of the polyconductive material are utilized directly in the terminal block in a substantially simpler and more economic construction. Moreover, although the present invention has been described particularly with respect to terminal blocks, it is to be understood that the invention is suitable for use in any type of electrical circuit or with other electrical devices or appliances where it is necessry to limit large current surges. Furthermore, the device of the invention has a broader use as a time delay element since it can delay electrical current of large magnitudes for a predetermined amount of time until the current passing to the polyconductor device heats its to its critical transition temperature at which point it becomes substantially conductive.

While in the above description the contacts have been described as relay switch contacts, it should be apparent that the invention is suitable for use in any sort of operation where it is necessary to delay large current surges. The device is thus not limited to simply protecting switch contacts from the deteriorating effects of arcing due to bouncing but is suitable for use in protecting other types of devices. Furthermore the device of the invention has a broader use as a time delay element. In such other embodiments it is used to delay electrical current of large magnitude for a predetermined amount of time until the current passing through the polyconductor device heats it to the critical temperature, at which point it becomes substantially conductive. It is thus broadly usable as a time delay device.

The polyconductive material of the present invention is described above as being vanadium dioxide ($VO_2$ or $V_2O_4$) but it should be apparent that the polyconductive material may be any one of a number of other negative temperature-resistance characteristic materials known in the art and discussed in detail in the above-mentioned patents. Such other suitable polyconductors, by way of example only, are vanadium dioxides modified with minor amounts of flouride and optionally with metals other than vanadium, $V_2O_4$, $V_4O_7$, $V_5O_9$, $V_6O_{11}$, $V_8O_{15}$, $V_6O_{13}$, $Ti_2O_3$, $Ti_3O_5$, $Ti_5O_9$, $NbO_2$, $Fe_3O_4$, NiS, CrS, FeS, $FeSi_2$ and CrN. Further, the polyconductive material in still other embodiments may comprise mixtures of these materials.

The above-described embodiments of the present invention are intended in all respects as being illustrative and not restrictive of the scope of the present invention. Thus the present invention may be subjected to many modifications and changes without departing from the spirit or essential characteristics thereof.

What is claimed is:

1. In an electrical circuit having at least two contacts that are systematically mated and unmated, a device to prevent breakdown of said contacts due to current surges causing arcing across said contacts, said device comprising:
   a polyconductive member formed of material having a negative temperature-resistance characteristic such that its resistance at temperatures below a predetermined critical temperature is at least several orders of magnitude larger than its resistance at temperatures above the critical temperature; and
   means connecting said polyconductor member in series with said contacts,
   whereby electrical current passing through the polyconductive material initially encounters a high resistance until sufficient current passes to raise the temperature of the polyconductive material by Joule effect heating to above the critical temperature after a predetermined time period sufficient to allow said contacts to stop bouncing and achieve a stable mated state after which full current is allowed to pass maintaining said polyconductor heated above the critical temperature.

2. A contact protection device according to claim 1 wherein the polyconductive member is selected from at least one member of the materials of the group consisting of $VO_2$, $V_2O_4$, $V_4O_7$, $V_5O_2$, $V_6O_{11}$, $V_8O_{15}$, $V_6O_{13}$, $Ti_2O_3$, $NbO_2$, $Fe_3O_4$, NiS, FeS, CrS, $FeSi_2$, and CrN.

3. A contact protection device according to claim 1 further comprising:
   a material having a high resistivity and low temperature coefficient characteristics mixed with the polyconductive material to aid in the Joule effect heating of the polyconductive material when electric current is applied thereto.

4. A contact protection device according to claim 3 wherein the high resistivity material comprises a carbon compound.

5. A contact protection device which prevents arcing between mating pairs of contacts during contact engagement comprising:
   a hollow sleeve of insulation material;
   a first electrode having one end hermetically sealed within one end of the sleeve;
   a second electrode having one end hermetically sealed within another end of the sleeve;
   polyconductive member in the form of a plurality of crushed polyconductive crystals at least partially filling said sleeve, said polyconductive crystals having a negative temperature-resistance characteristic such that its resistance at temperatures below a predetermined critical temperature is at least several orders of magnitude larger than its resistance at temperatures above the critical temperature; and
   spring biased means for simultaneously pressing against the polyconductor crystals and maintaining an electrical connection between the polyconductor crystals and the electrodes;
   means connecting said electrodes in series with a pair of electrical contacts to be protected whereby electrical current passing through the polyconductive member initially encounters a high resistance until sufficient current passes to raise the temperature of the polyconductive material by Joule effect heating to above the critical temperature after a predetermined time period sufficient to allow said contacts to stop bouncing and achieve a stable condition after which full current passes through said polyconductive member which is maintained above the critical temperature.

6. A contact protection device according to claim 5 wherein the polyconductive member is selected from at least one member of the materials of the group consisting of $VO_2$, $V_2O_4$, $V_4O_7$, $V_5O_2$, $V_6O_{11}$, $V_8O_{15}$, $V_6O_{13}$, $Ti_2O_3$, $Ti_3O_5$, $NbO_2$, $Fe_3O_4$, NiS, CrS, FeS, $FeSi_2$, and CrN.

7. A contact protection device according to claim 5 further comprising:
   a material having a high resistivity and low temperature coefficient characteristics mixed with the polyconductive material to aid in the Joule effect heating of the polyconductive material when electric current is applied thereto.

8. A contact protection device according to claim 7 wherein the high resistivity material comprises a carbon compound.

9. A device for delaying current flow through a pair of electricl contacts and delaying full current until the contacts have achieved a stable closed condition, said device comprising:
   a member formed of a polyconductive material having a negative temperature-resistance characteristic such that its resistance at temperatures below a predetermined critical temperature is at least several orders of magnitude larger than its resistance at temperatures above the critical temperature, and means connecting said member in series with the contacts to be protected, whereby electrical current passing through the polyconductive material raises the temperature thereof by Joule effect heating to above the critical temperature after a predetermined time period sufficient to allow stabilization of said contacts in a closed condition before reverting to its low resistance state allowing full current to pass.

10. A device as recited in claim 9 wherein the polyconductive material is selected from at least one member of the materials of the group consisting of $VO_2$, $V_2O_4$, $V_4O_7$, $V_5O_2$, $V_6O_{11}$, $V_8O_{15}$, $V_6O_{13}$, $Ti_2O_3$, $Ti_3O_5$, $Ti_5O_9$, $NbO_2$, $Fe_3O_4$, NiS, CrS, FeS, $FeSi_2$, and CrN.

11. A device as recited in claim 9 further comprising:
a material having a high resistivity and low temperature coefficient characteristics mixed with the polyconductive material to aid in the Joule effect heating of the polyconductive material when electric current is applied.

12. A device as recited in claim 11 wherein the high resistivity material comprises a carbon compound.

13. A device as recited in claim 9 further comprising:
a hollow sleeve of electrical and thermally insulating material;
a first electrode having one end hermetically sealed within one end of the sleeve;
a second electrode having one end hermetically sealed within another end of the sleeve;
the polyconductive material in the form of a plurality of crushed crystals at least partially filling said sleeve; and
spring biased means for simultaneously pressing against the polyconductor crystals and maintaining an electrical connection between the polyconductor crystals and the electrodes.

14. A device for preventing deterioration of electrical contacts in a circuit due to arcing during mating of said contacts, said device comprising:
a supporting block,
a pair of electrically conductive elements mounted in said block, and
a polyconductor mounted in said block and electrically connected in series between said electrically conductive elements, said polyconductor having a negative temperature-resistance characteristic such that its electrical resistance value at temperatures below a predetermined transition temperature is at least several orders of magnitude larger than its resistance value at temperatures above said transition temperature, a material having a high resistivity and low temperature coefficent characteristic mixed with the polyconductive material to aid in Joule effect heating of the polyconductive material when electric current is applied whereby when current is supplied to one of said conductive elements, said polyconductor initially has a high resistance value and is heatd to a temperature above its transition temperature by Joule effect heating at which point said polyconductor becomes conductive, said heating taking place over a time span exceeding that required for said contacts to achieve a stable mated condition.

15. The device as defined in claim 14 wherein said polyconductor is formed from a material selected from at least one member of the materials of the group consisting of $VO_2$, $V_2O_4$, $V_4O_7$, $V_5O_9$, $V_6O_{11}$, $V_8O_{15}$, $V_6O_{13}$, $Ti_2O_3$, $Ti_3O_5$, $Ti_5O_9$, $NbO_2$, $Fe_3O_4$, NiS, CrS, FeS, $FeSi_2$ and CrN.

16. The device as defined in claim 14 wherein the high resistivity material comprises a carbon compound.

17. The device as defined in claim 14 further comprising:
at least one conductive spring means operatively engaged between said polyconductor and at least one of said conductive elements to bias said polyconductor into engagement with the other of said elements.

18. The device as defined in claim 14 wherein said polyconductor is in direct contact with at least one of said conductive elements.

19. The device as defined in claim 18 wherein said polyconductor has a pair of opposed end portions of predetermined configuration respectively positioned in mating engagement with complementary portions of said conductive elements.

20. The device as defined in claim 14 wherein said supporting block comprises a terminal block formed of an insulating material.

21. The device as defined in claim 20 wherein said conductive elements are removably mounted in said block.

* * * * *